United States Patent
Solanki et al.

(10) Patent No.: US 12,526,165 B2
(45) Date of Patent: Jan. 13, 2026

(54) SYSTEMS AND METHODS FOR VERIFIABLE SECURE COMPUTING USING MULTI-PARTY COMPUTATION AND BLOCKCHAIN NETWORK

(71) Applicant: Acronis International GmbH, Schaffhausen (CH)

(72) Inventors: Sanjeev Solanki, Singapore (SG); Koon Shen Goh, Singapore (SG); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 336 days.

(21) Appl. No.: 18/321,870

(22) Filed: May 23, 2023

(65) Prior Publication Data
US 2024/0396753 A1 Nov. 28, 2024

(51) Int. Cl.
*H04L 9/00* (2022.01)
*H04L 9/08* (2006.01)

(52) U.S. Cl.
CPC ............... *H04L 9/50* (2022.05); *H04L 9/085* (2013.01); *H04L 2209/46* (2013.01)

(58) Field of Classification Search
None
See application file for complete search history.

(56) References Cited

U.S. PATENT DOCUMENTS

| | | | | |
|---|---|---|---|---|
| 10,637,670 | B2* | 4/2020 | Lindell | H04L 9/3239 |
| 11,424,916 | B2* | 8/2022 | Roy | H04L 9/30 |
| 11,683,164 | B2* | 6/2023 | Covaci | H04L 9/3239 713/164 |
| 11,799,637 | B2* | 10/2023 | Fletcher | H04L 9/0825 |
| 11,803,844 | B2* | 10/2023 | Le Van Gong | G06Q 20/3825 |
| 2016/0335440 | A1* | 11/2016 | Clark | H04L 9/085 |
| 2018/0198624 | A1* | 7/2018 | Bisti | H04L 9/3247 |
| 2018/0205707 | A1* | 7/2018 | Bellala | H04L 9/085 |
| 2018/0218171 | A1* | 8/2018 | Bellala | G06F 21/6254 |
| 2018/0219842 | A1* | 8/2018 | Bellala | H04L 67/12 |
| 2019/0037012 | A1* | 1/2019 | Stöcker | G06Q 20/223 |
| 2019/0279172 | A1* | 9/2019 | Duffield | H04L 9/3239 |
| 2019/0361842 | A1* | 11/2019 | Wood | G06V 30/418 |

(Continued)

*Primary Examiner* — Kambiz Zand
*Assistant Examiner* — Mahabub S Ahmed
(74) *Attorney, Agent, or Firm* — ArentFox Schiff LLP; Michael Fainberg

(57) ABSTRACT

The techniques described herein relate to systems and methods for executing a verifiable confidential computation using both an MPC network and a blockchain network. An exemplary method includes: assigning using at least one smart contract in the blockchain network: a first owner node that stores private data, a plurality of controller nodes that each store a respective data share of the private data, a first analyst node that indicates a respective computation of the secure MPC to execute on each corresponding data share stored on the plurality of controller nodes, and a plurality of processor nodes that execute each respective computation of the secure MPC on each corresponding data share and output a result; executing the secure MPC on the private data of the first owner node using the plurality of controller nodes, the first analyst node, and the plurality of processor nodes; recording the result on a blockchain.

19 Claims, 8 Drawing Sheets

(56) References Cited

U.S. PATENT DOCUMENTS

| | | | | |
|---|---|---|---|---|
| 2019/0393722 | A1* | 12/2019 | Stöcker | H02J 13/00034 |
| 2020/0028360 | A1* | 1/2020 | Heintel | H04L 9/50 |
| 2020/0050386 | A1* | 2/2020 | Natarajan | H04L 63/123 |
| 2020/0133716 | A1* | 4/2020 | Nakamura | G06F 16/1837 |
| 2020/0204346 | A1* | 6/2020 | Trevethan | H04L 9/3218 |
| 2020/0328893 | A1* | 10/2020 | Westland | H04L 63/123 |
| 2020/0328894 | A1* | 10/2020 | Baker | H04L 9/3239 |
| 2021/0049600 | A1* | 2/2021 | Spector | H04L 9/085 |
| 2021/0091934 | A1* | 3/2021 | Fletcher | H04L 9/0847 |
| 2021/0217001 | A1* | 7/2021 | Harrison | H04L 9/50 |
| 2021/0273812 | A1* | 9/2021 | Hardin | H04L 9/0894 |
| 2021/0377012 | A1* | 12/2021 | Bernat | G06F 21/40 |
| 2021/0391983 | A1* | 12/2021 | Will | H04L 9/3066 |
| 2022/0021711 | A1* | 1/2022 | Marsh | H04L 9/3247 |
| 2022/0038271 | A1* | 2/2022 | Ranellucci | H04L 9/0819 |
| 2022/0038273 | A1* | 2/2022 | Lee | H04L 9/3247 |
| 2022/0069979 | A1* | 3/2022 | Yanai | H04L 9/3218 |
| 2022/0121521 | A1* | 4/2022 | Eldefrawy | H04L 9/085 |
| 2022/0123927 | A1* | 4/2022 | Fletcher | H04L 9/3297 |
| 2022/0247818 | A1* | 8/2022 | Ragothaman | H04L 67/1095 |
| 2022/0318907 | A1* | 10/2022 | Bleznak | G06Q 20/065 |
| 2022/0405746 | A1* | 12/2022 | Mamoni | G06Q 20/3825 |
| 2023/0066582 | A1* | 3/2023 | Le Van Gong | H04L 9/50 |
| 2023/0139878 | A1* | 5/2023 | Clark | H04L 9/3297 713/157 |
| 2023/0177496 | A1* | 6/2023 | Le Van Gong | H04L 9/3247 |
| 2023/0186293 | A1* | 6/2023 | Dolev | H04L 9/0869 705/75 |
| 2023/0370275 | A1* | 11/2023 | Aspler-Yaskil | H04L 9/50 |
| 2023/0385814 | A1* | 11/2023 | Gauthier | H04L 9/3255 |
| 2023/0421397 | A1* | 12/2023 | Ocegueda | H04L 9/0825 |
| 2024/0080191 | A1* | 3/2024 | Vinayagamurthy | H04L 12/1813 |
| 2024/0111788 | A1* | 4/2024 | Shah | G06F 16/275 |
| 2024/0249289 | A1* | 7/2024 | Chiapuzio | H04L 9/008 |
| 2024/0329936 | A1* | 10/2024 | De Vega Rodrigo | H04L 9/0894 |
| 2024/0370865 | A1* | 11/2024 | Bernardi | G06Q 20/36 |
| 2024/0388442 | A1* | 11/2024 | Zyskind | H04L 9/50 |
| 2024/0405976 | A1* | 12/2024 | Chen | H04L 9/50 |
| 2024/0420125 | A1* | 12/2024 | Le-Huy | H04L 9/50 |
| 2024/0427867 | A1* | 12/2024 | Wang | G06F 21/32 |
| 2025/0039003 | A1* | 1/2025 | Kiraz | H04L 63/0428 |
| 2025/0158839 | A1* | 5/2025 | Burns | H04L 9/3236 |

\* cited by examiner

SYSTEMS AND METHODS FOR VERIFIABLE SECURE COMPUTING USING MULTI-PARTY COMPUTATION AND BLOCKCHAIN NETWORK

FIELD OF TECHNOLOGY

The present disclosure relates to the field of data security, and, more specifically, to systems and methods for verifiable secure computing using multi-party computation (MPC) and blockchain network.

BACKGROUND

As the world continues to generate an ever-increasing amount of data, governments and companies are becoming more aware of the importance of data and its applications. This has prompted governments around the globe to draft tighter regulations for the handling of data of their citizens—in particular private information. One of methods that companies employ to conform to the regulations is to create independent data silos in various jurisdictions worldwide. However, restricting the data from leaving their respective jurisdictions means that companies are unable to extract unique insights that can only be derived from the combined data. This makes algorithms utilizing the segregated data being less effective and makes for larger amounts of data to be stored in individual silos because the data cannot be shared (being less storage efficient).

One conventional approach to solve this problem is to engage an independent third party that is trusted by all participants (i.e., from different jurisdictions governed by different entities) to receive the data from each source, and perform the requested computation on the combined data. However, it is a challenge for all of the involved parties to agree on an independent third party. This makes this approach ineffective.

SUMMARY

The present disclosure describes verifiable secure computing using multi-party computation and blockchain network. The system is built on a combination of both secure computing and blockchain technologies—using smart contracts to enforce the governance of the system between blockchain network participants, and performing the actual privacy preserving computations off-chain with an MPC network. This allows to deploy a distributed, verifiable, and tamper-proof system that any blockchain network participant can interact with through a set of Application Programming Interfaces (APIs) performing an off-chain private computation on datasets that they are authorized to be computed on.

In addition, the combination of both technologies enables the development of data provenance of the private data on the blockchain. By hashing the shares and placing the hashes on the blockchain, the system is able to guarantee that the receiver of the shares can compute the digest and verify that shares have not been tampered with. Additionally, by using resharing techniques, the system ensures that even when the data is used for multiple computations, no single party is able to collect all the shares of a particular instance and reconstruct the original private/sensitive data.

In some aspects, the techniques described herein relate to a method for executing a secure multi-party computation (MPC) using both an MPC network and a blockchain network, the method including: assigning using at least one smart contract of the blockchain network: a first owner node that stores private data, a plurality of controller nodes that each store a respective data share of the private data off-chain from the blockchain network, a first analyst node that indicates a respective computation of the secure MPC to execute on each corresponding data share stored on the plurality of controller nodes, and a plurality of processor nodes that execute, off-chain from the blockchain network, each respective computation of the secure MPC on each corresponding data share and output a result; executing the secure MPC on the private data of the first owner node using the plurality of controller nodes, the first analyst node, and the plurality of processor nodes; and recording the result of the executed secure MPC on a blockchain of the blockchain network.

In some aspects, the techniques described herein relate to a method, wherein the at least one smart contract includes a registry contract that identifies and indicates a role of each node in the blockchain network and the MPC network, wherein a node may have one or more roles as an owner node, a controller node, an analyst node, and a processor node.

In some aspects, the techniques described herein relate to a method, wherein the at least one smart contract includes a data contract, wherein the first owner node is configured to: generate a plurality of data shares of the private data; generate the data contract that specifies the plurality of controller nodes that will receive the plurality of data shares, wherein one controller node is assigned one data share; and transmit each data share of the plurality of data shares to a corresponding controller node of the plurality of controller nodes.

In some aspects, the techniques described herein relate to a method, wherein the first owner node is further configured to record in at least one block of the blockchain, a hash value of each data share of the plurality of data shares and identifiers of each corresponding controller node that received each data share.

In some aspects, the techniques described herein relate to a method, wherein the at least one smart contract includes a network contract that identifies the plurality of processor nodes as part of a computational network that performs computations off-chain.

In some aspects, the techniques described herein relate to a method, wherein the at least one smart contract further includes a job contract, wherein the first analyst node is configured to: determine at least one computation of the secure MPC; and generate the job contract that specifies at least one processor node that will perform the at least one computation and at least one controller node that will provide a given data share.

In some aspects, the techniques described herein relate to a method, further including: executing a resharing protocol that generates a new set of data shares in response to detecting a transfer of data shares between the plurality of controller nodes.

In some aspects, the techniques described herein relate to a method, wherein the resharing protocol is shamir's secret sharing.

In some aspects, the techniques described herein relate to a method, wherein the blockchain network includes a second owner node with different private data and a second analyst node assigned using at least one other smart contract, further including: executing a different secure MPC on the different private data of the second owner node using another plurality of controller nodes, the second analyst node, and another plurality of processor nodes of the blockchain network; and recording a result of the executed different secure MPC on the blockchain of the blockchain network.

In some aspects, the techniques described herein relate to a method, wherein at least one processor node is part of both the plurality of processor nodes and the another plurality of processor nodes.

In some aspects, the techniques described herein relate to a method, wherein at least one controller node is part of both the plurality of controller nodes and the another plurality of controller nodes.

In some aspects, the techniques described herein relate to a method, wherein the first owner node is one of the plurality of controller nodes.

In some aspects, the techniques described herein relate to a method, wherein a processor node is also a controller node.

It should be noted that the methods described above may be implemented in a system comprising a hardware processor. Alternatively, the methods may be implemented using computer executable instructions of a non-transitory computer readable medium.

In some aspects, the techniques described herein relate to a system for executing a secure multi-party computation (MPC) using both an MPC network and a blockchain network, including: a memory; and a hardware processor communicatively coupled with the memory and configured to: assign using at least one smart contract of the blockchain network: a first owner node that stores private data, a plurality of controller nodes that each store a respective data share of the private data off-chain from the blockchain network, a first analyst node that indicates a respective computation of the secure MPC to execute on each corresponding data share stored on the plurality of controller nodes, and a plurality of processor nodes that execute, off-chain from the blockchain network, each respective computation of the secure MPC on each corresponding data share and output a result; execute the secure MPC on the private data of the first owner node using the plurality of controller nodes, the first analyst node, and the plurality of processor nodes; and record the result of the executed secure MPC on a blockchain of the blockchain network.

In some aspects, the techniques described herein relate to a non-transitory computer readable medium storing thereon computer executable instructions for executing a secure multi-party computation (MPC) using both an MPC network and a blockchain network, including instructions for: assigning using at least one smart contract of the blockchain network: a first owner node that stores private data, a plurality of controller nodes that each store a respective data share of the private data off-chain from the blockchain network, a first analyst node that indicates a respective computation of the secure MPC to execute on each corresponding data share stored on the plurality of controller nodes, and a plurality of processor nodes that execute, off-chain from the blockchain network, each respective computation of the secure MPC on each corresponding data share and output a result; executing the secure MPC on the private data of the first owner node using the plurality of controller nodes, the first analyst node, and the plurality of processor nodes; and recording the result of the executed secure MPC on a blockchain of the blockchain network.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
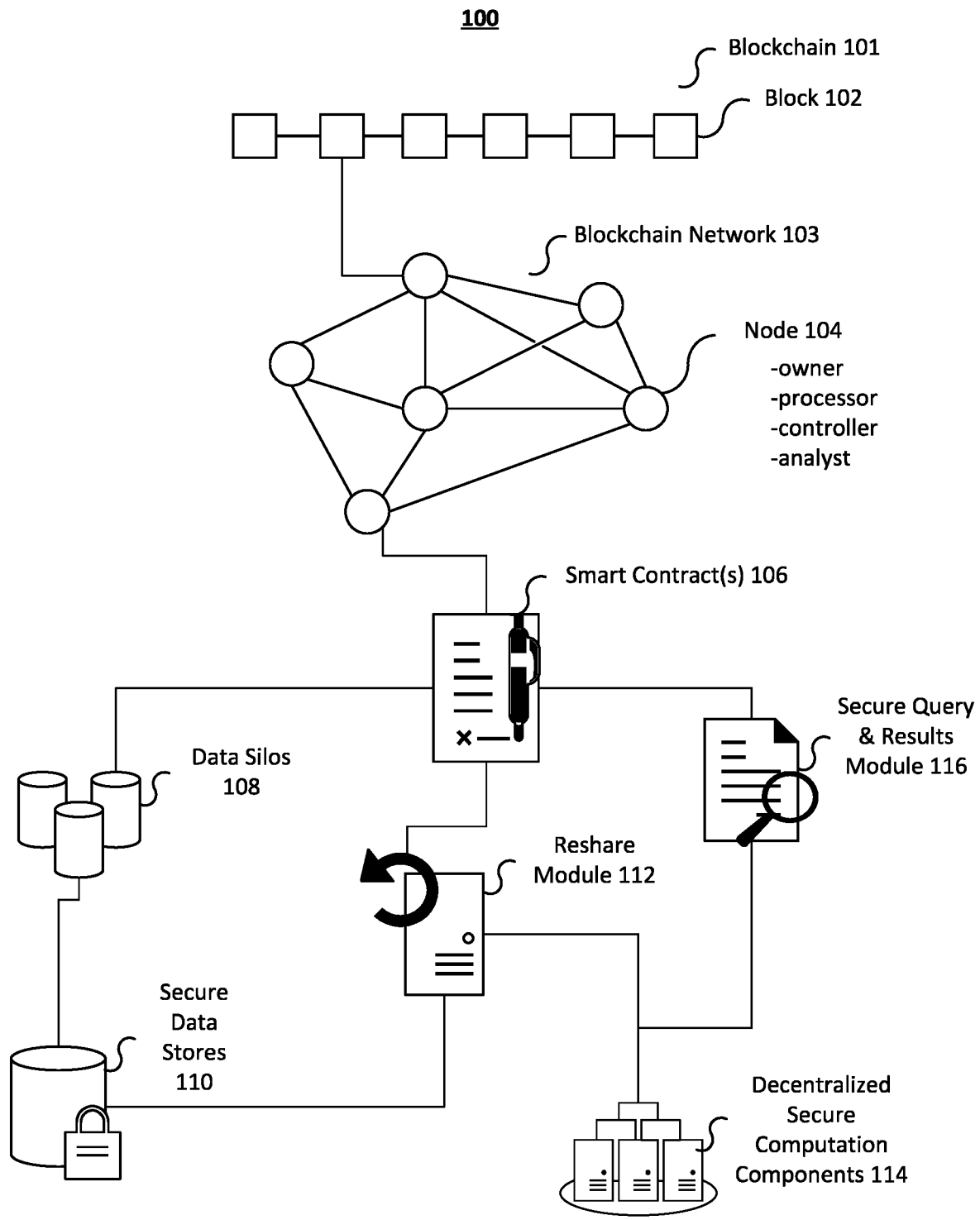
FIG. 1 is a block diagram illustrating a system for distributing a privacy preserving arithmetic computation on private data over a subset of independent network participants.

Exemplary aspects are described herein in the context of a system, method, and computer program product for distributing a secure multi-party computation over a blockchain network. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Multi-party computation (MPC) refers to a set of algorithms that enables a user to perform a specified arithmetic circuit over a network of nodes without revealing the data inputs used for the computation to any single party involved in the process.

Blockchain allows for a group of independent parties to reach a consensus on a series of cryptographically provable changes in the state of the network. This technology can be used to perform a procedure on the state of the network without a single trusted party using smart contracts. However, all the data on the blockchain is public and accessible to everyone in the network. Thus, it is not suitable to perform private computations using smart contracts as doing so will require disclosing private data to all the network participants.

The present disclosure leverages both MPC and blockchain technologies to create a distributed system that allows a blockchain user to delegate an arbitrary computation to a subset of independent network participants, without compromising the privacy of their data to any single participant in the network.

In particular, the systems and methods of the present disclosure utilize the benefits of MPC to perform private computations off chain between the network participants. MPC on its own requires coordination between at least three or more independent parties to set up a network for performing the privacy preserving computation. When arranging such coordination, it is often a challenge to set up the network between independent parties on a moment's notice. However, using the advantages of blockchain, the systems and methods of the present disclosure automate the process of setting up the network and enforce the governance of the system to ensure that no single party is able to compromise the network.

The systems and methods of the present disclosure use smart contracts to enforce the governance of system between network participants, and use MPC to perform the actual privacy persevering computations off chain. This allows for the development of a public, transparent, and tamper-proof Application Programming Interface (API) that any network participant can call on to perform an off-chain private computation on data that they are authorized to access.

The combination of both technologies further enables data provenance of the private data on the blockchain. By hashing the shares and placing the hashes on the blockchain, the systems and methods are able to guarantee that the receiver of the shares can compute the data hash and verify that shares have not been tampered with.

Additionally, by using resharing techniques of converting existing shares to new set of random shares the systems and methods ensure that even when the data is used for multiple computations, no single party is able to collect all the shares of a particular instance and reconstruct the original data. Every new computation receives new set of shares for same dataset.

FIG. 1 is a block diagram illustrating system 100 for distributing a privacy preserving arithmetic computation on private data over a subset of independent network participants. More specifically, system 100 is directed to executing a secure multi-party computation over a blockchain network.

System 100 includes blockchain network 103, which is made up of a plurality of nodes such as node 104. A given node may be classified as an owner, a processor, a controller, and/or an analyst. Smart contract(s) 106 govern certain transactions that occur on blockchain 101, which includes a plurality of blocks such as block 102 and is maintained by blockchain network 103. System 100 also includes a plurality of data silos 108, where each silo includes private data that cannot be revealed to or transferred to other data silos.

System 100 utilizes MPC, which allows multiple parties to evaluate an arithmetic circuit on private data stored in data silos 108 with provable privacy guarantees against passive adversaries. This ensures that no single party is able to gain any information about the private data.

Secure data stores 110 of system 100 may be used to store secret shares and distribute them. Reshare module 112 performs a resharing function. Resharing enables the creation of a new set of shares from an old set of shares, without needing to combine the shares before splitting them again. Decentralized secure computation components 114 may perform the computations on secret shares. The results from the computations may be stored and are made accessible using secure query & results module 116.

Figure 2:
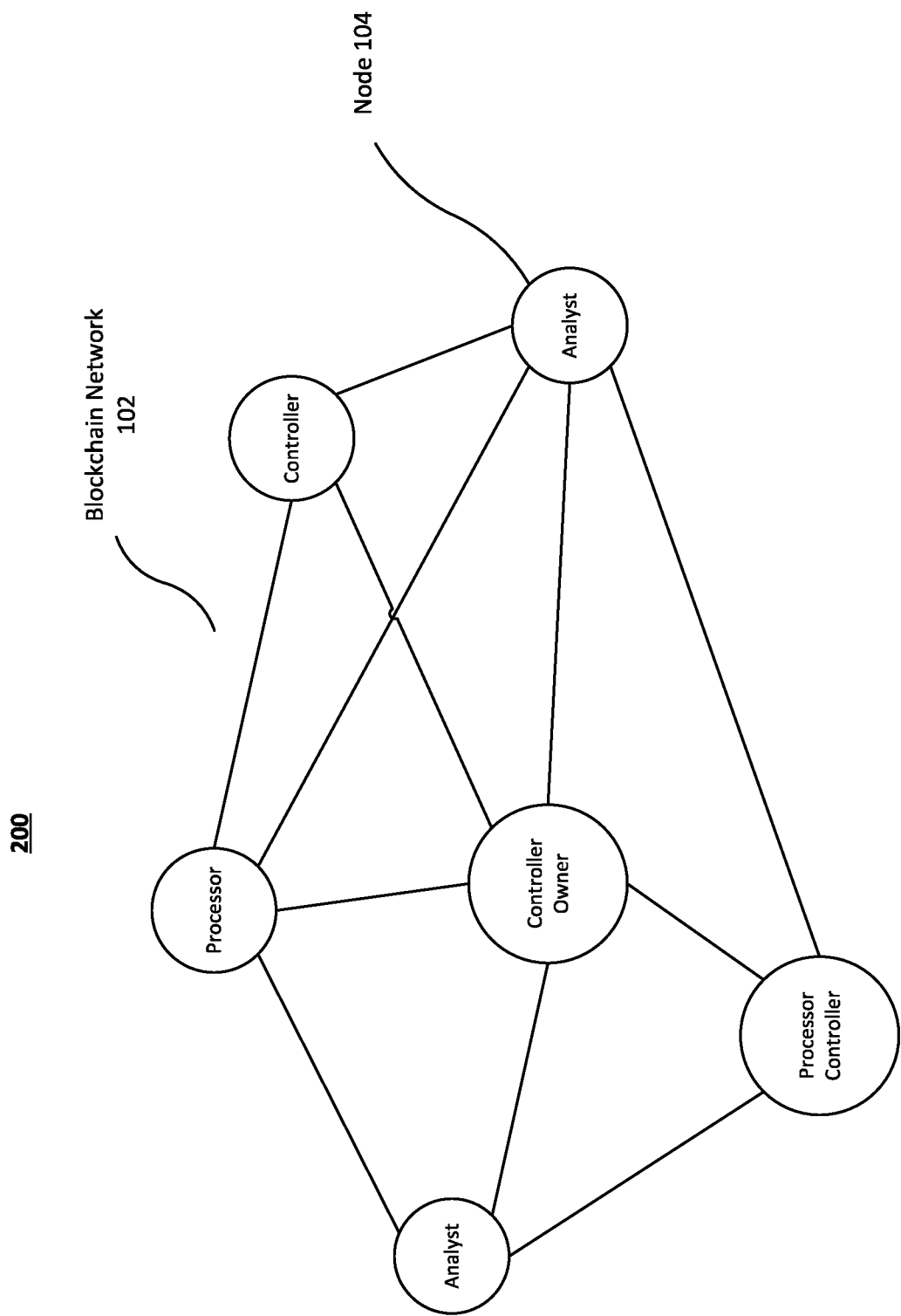
FIG. 2 is a block diagram illustrating the participant nodes operating on top of the blockchain infrastructure.

FIG. 2 is a block diagram 200 illustrating the participant nodes operating on top of the blockchain infrastructure. As mentioned previously, a node have one or more of the following roles: owner, processor, controller, and analyst. Similarly, smart contract(s) 106 include various types of contracts such as: a registry contract, a data contract, a network contract, and a job contract. Each participant in system 100 is associated to a blockchain address. A single participant may play multiple roles in our system. For example, the system shown in diagram 200 may run on top of an Ethereum-based blockchain network and without requiring any specific modification to the underlying blockchain node.

An owner node is a node that makes data available to other network participants. For example, an owner node may have data stored in one of data silos 108. Suppose that a given owner node belongs to a human resources department of a company that seeks to determine the average market salary of a job position to determine whether their salaries are competitive. The owner node may utilize secure query & results module 116 to describe the query that the owner node wishes to perform and retrieve results.

The owner node may create a smart contract 106 (i.e., a data contract) that stores the metadata (e.g., names, data type, valid range of each column in the dataset, size, content, etc.) of the salary dataset. Because the dataset includes salaries of employees, a company may not wish to release this information and keep it private. The owner node is responsible for generating the initial shares of the dataset and appointing a set of controller nodes to receive the shares for storage and retrieval. In a simple example, consider a small dataset with salaries of 3 employees. Consider an example of computing the sum of the private dataset [70000, 190000, 130000]. The inputs are first split into shares, where the shares sum up to the original input (e.g., 70000=50000+40000+(−20000), 190000=140000+(−30000)+80000, 130000=70000+80000+(−10000)]. The shares are then distributed to three controller nodes, P0, P1 and P2. P0 would receive [50000, 140000, 70000], P1 would receive [40000, −30000, 80000] and P2 would receive [−20000, 80000, −10000]. The owner node may transmit the shares to each controller node and generate a block on blockchain 101 that identifies the owner node, the recipient controller nodes, and the hash values of each share.

A controller node is a node configured to provide long-term storage of the shares, ensure the availability of the shares, as well as manage the shares to ensure data provenance. A plurality of controller nodes serve as secure data stores 110. The properties of the MPC protocol ensures that no single controller node is able to gain information about the original dataset from their share.

Resharing module 112, which is installed on each node of blockchain network 103, executes a resharing protocol every time the shares are accessed by a node. Resharing is done in order to prevent a class of attack that allows an attacker to reconstruct the dataset. For example, if the same dataset is being used for multiple computations, with each computation occurring on a different set of processors, there is a possibility that a single processor is selected to participate in all the computations and receives all the shares of the dataset (i.e. taking the roles of P0, P1 and P2 over 3 separate computations on the same dataset). Instead of tracking and then restricting the participation of the nodes, the system of the present disclosure proactively executes the resharing protocol so that the shares are changed and cannot be used across multiple computations.

This resharing protocol is also executed when transferring the shares between two sets of controller nodes. This prevents controller nodes from simply transmitting the shares to one another to recreate the original dataset. The resharing protocol may involve using techniques such as Shamir's secret sharing. For example, the old set of shares represent the polynomial f(x). A new polynomial, f'(x), is then generated via resharing module 112 on the node initiating access or a data transfer. The new polynomial has the property f(0)=0, and is of the same degree as f(x). The shares generated from the new polynomial are then added to the shares of the original to obtain a new set of shares that represent the polynomial f(x)+f'(x). This allows one to recover the secret with the new shares as f(x)+f'(x)=f(x) when x=0.

An analyst node is a node configured to compose the computation to be executed on the available datasets, which includes acquiring the necessary permissions from the network participants. For example, the computation in the case of the salary function may be to determine sum of all shares. Then the sum may be divided by amount of entries in the salary dataset (e.g., 3). An analyst node may provide the equation as AVG=SUM(s1, s2, . . . sN)/N, where N represents the total number of entries. For example, the analyst node may identify a first processor node to sum the salary shares of the first controller node and divide by the number of shares, a second processor node to sum the salary shares of the second controller node and divide by the number of shares, a third processor node to sum the salary shares of the third processor node and divide by the number of shares. The analyst node may then receive each output from the respective processor nodes and construct the final result.

A processor node is a node configured to retrieve a respective share from a controller node and run a distributed computation as specified by an analyst node. A set of processor nodes form a computation network (discussed in FIG. 4) that is able to perform the MPC. When the computation is complete, the results are stored on blockchain 101 for the owner node to retrieve. The combination of processor nodes makes up decentralized secure computation components 114.

For example, in the salary example, each processor node would sum their respective shares retrieved from controller nodes and divide by the number of shares (N) to return the resulting shares [83333, 30000, 16666] as shown based on the table below:

| N = 3 | P0 | P1 | P2 |
| --- | --- | --- | --- |
| X | 50000 | 40000 | −20000 |
| Y | 140000 | −30000 | 80000 |
| Z | 70000 | 80000 | −10000 |
| (X + Y + Z)/N | 83333 | 30000 | 16666 |

The analyst node would then receive the results shares from each processor node and sum them to reconstruct the final result.

$$83333 + 30000 + 16666 = 130000 \qquad A$$

For example, the average salary may be determined to be $130,000.

Using this method, one is able to perform computations on the dataset without any single party being able to reconstruct the private dataset. In some aspects, the analyst node may generate a block on blockchain 101, which includes identifiers of the analyst node(s), the processor nodes involved in the computation, the controller nodes providing the shares, the owner node(s), and the hash value of the final result. Using secure query & results module 116, the owner node may retrieve the actual final result.

Figure 3:
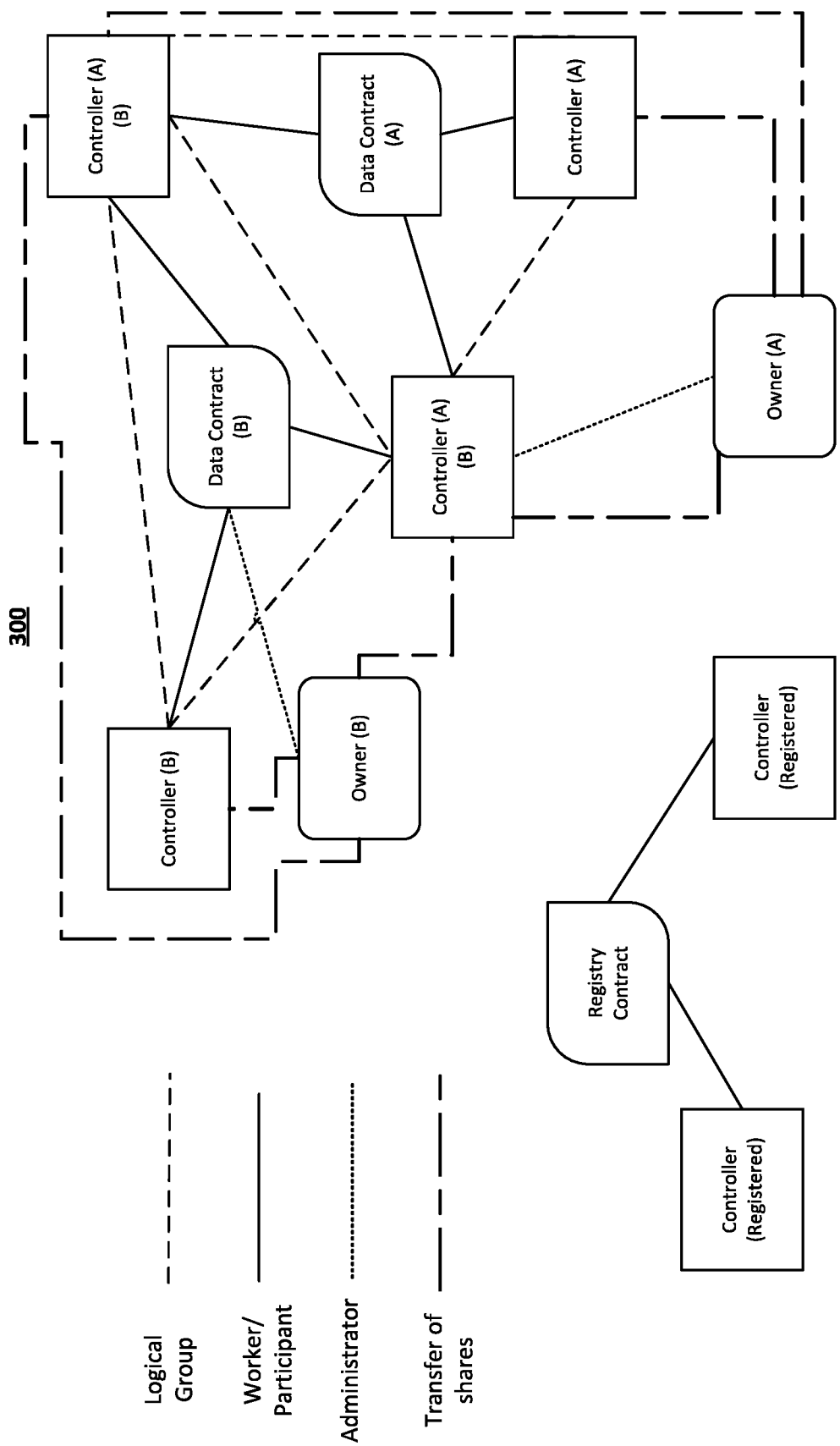
FIG. 3 is a block diagram illustrating data uploading and provisioning on a plurality of participant nodes operating over a blockchain infrastructure.

FIG. 3 is a block diagram 300 illustrating data uploading and provisioning on a plurality of participants operating over a blockchain infrastructure. When an owner node makes their dataset available and creates a data contract, there are a few steps that the owner node must perform in order to create the contract. A data contract holds information describing the dataset, as well as information that is used by system 100. It includes information such as the metadata, the method to access the shares (e.g., a URL for a website), authentication information of the server (e.g., Transport Layer Security (TLS) certificate), as well as permissions information for the dataset. The data contract also holds the hash of the shares to allow the receiver to validate that the data is not tampered with. The data owner is expected to create the data contract in order to make it available to other participants in our system.

First, the owner node must select a group of controller nodes that will manage access to the shares. The list of controller nodes that are making their services available can be retrieved from a registry contract. It should be noted that an owner node may appoint themselves as one of those controller nodes. A registry contract includes the list of service providers. In this case, a list of nodes that have expressed interest in participating as a controller node. The system is designed so that anyone can create a registry contract. The user is able to choose which registries to check for providers or even appoint their own provider that is not listed on any registry (assuming that provider was notified privately off-chain).

Once the set of controller nodes has been chosen, the owner node makes the initial shares of their dataset, and distributes the shares among the controller nodes. The hash of the shares is recorded in the data contract to ensure that the shares are not tampered with. The hash values are also stored in block(s) on blockchain 101.

For example, owner (B) generates data contract (B), which appoints controllers listed as controller (B) and controller (A) (B) as the controller nodes that will receive the shares from owner (B). Likewise, owner (A) generates data contract (A), which appoints controllers listed as controller (A) and controller (A) (B) as the controller nodes that will receive the shares from owner (A).

The controller nodes are then responsible for executing the data contract and providing a way to retrieve the shares based on the permissions given by the owner node. Permissions are managed based on the blockchain address. The data owner is able to allow other blockchain addresses to retrieve the shares of the dataset that is represented by the data contract.

Whenever the shares are received, the appointed group of controller nodes perform a resharing protocol using resharing module 112 in order to protect the shares against various types of attacks and maintain privacy. This resharing protocol is also performed when transferring the shares from one set of data controller nodes to another. In this case, there are two sets of controllers that are involved in generating the new shares. The original set of controllers that has the old shares and the receiving set of controllers that will be holding on to the new shares. In some aspects, it is possible for the old set to be the same as the new set.

Figure 4:
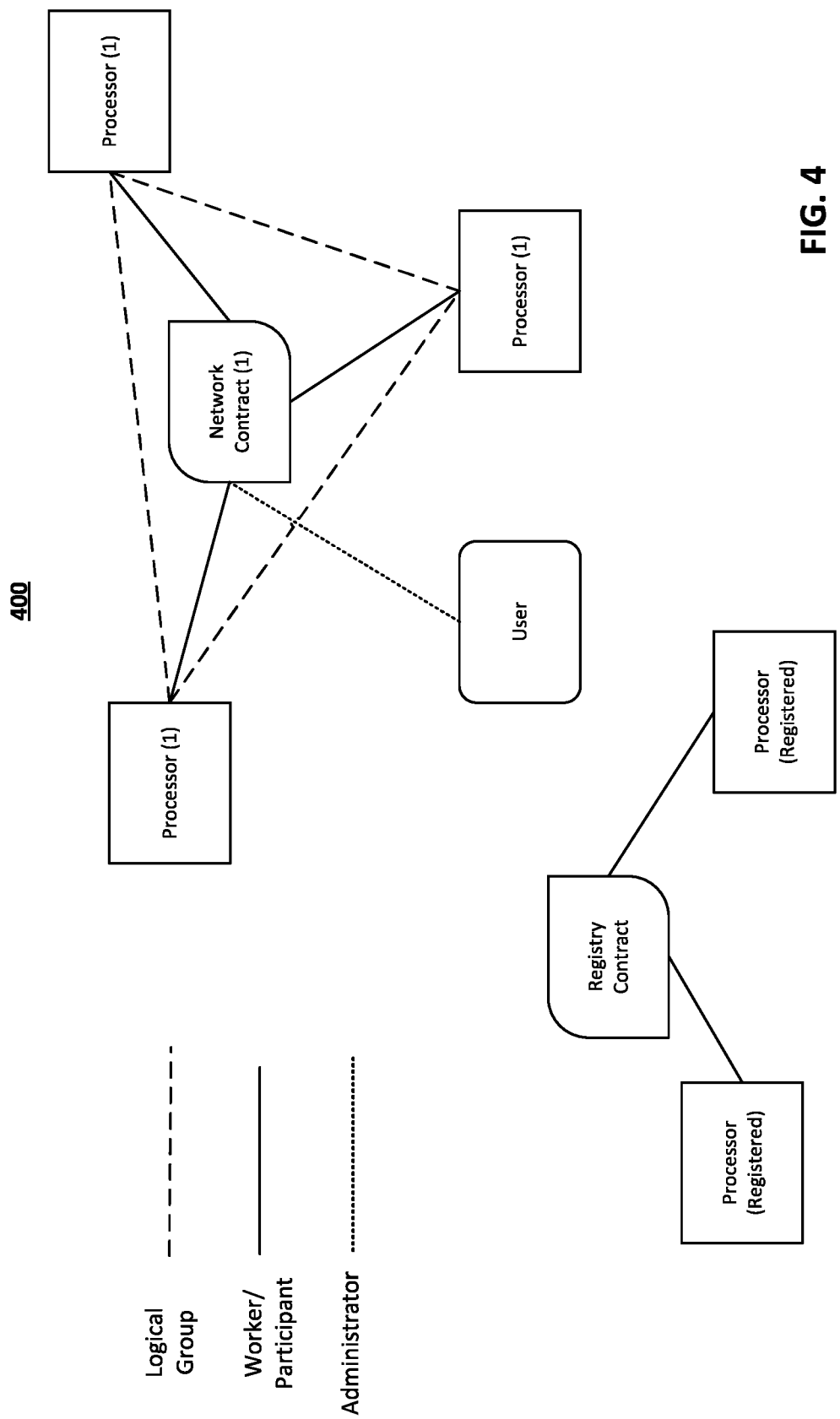
FIG. 4 is a block diagram illustrating provisioning of the computational network.

FIG. 4 is a block diagram 400 illustrating provisioning the computational network. A computational network represents a group of processor nodes that are responsible for performing the MPC protocol off-chain. While in conventional blockchain networks, on-chain computations involve all nodes, this off-chain computation is performed on a subset of the blockchain network and is therefore considered off-chain. Off-chain here means that it is not performed on the blockchain network. For example, to transfer data between two participants on the blockchain, you have to make a transaction, which makes your data visible to everyone on the blockchain. The off-chain equivalent can be anything from a TCP connection between the two parties to physically handing over a hard disk containing the data. The computations are not validated by the remaining nodes of blockchain network. The computational network may be formed by any user by creating a network contract that allows other users to run their query on.

In order to create a network contract, the user must select a group of processor nodes to form the computational network. The list of processor nodes that are making their services available may be retrieved from a registry contract. Once the set of processor nodes has been chosen, the processor nodes are responsible for setting up the MPC components as well as watching for queries that are given to the network contract by an analyst node. For example, in FIG. 4, a user creates network contract (1), which forms a network between each processor (1) in the blockchain network.

Figure 5:
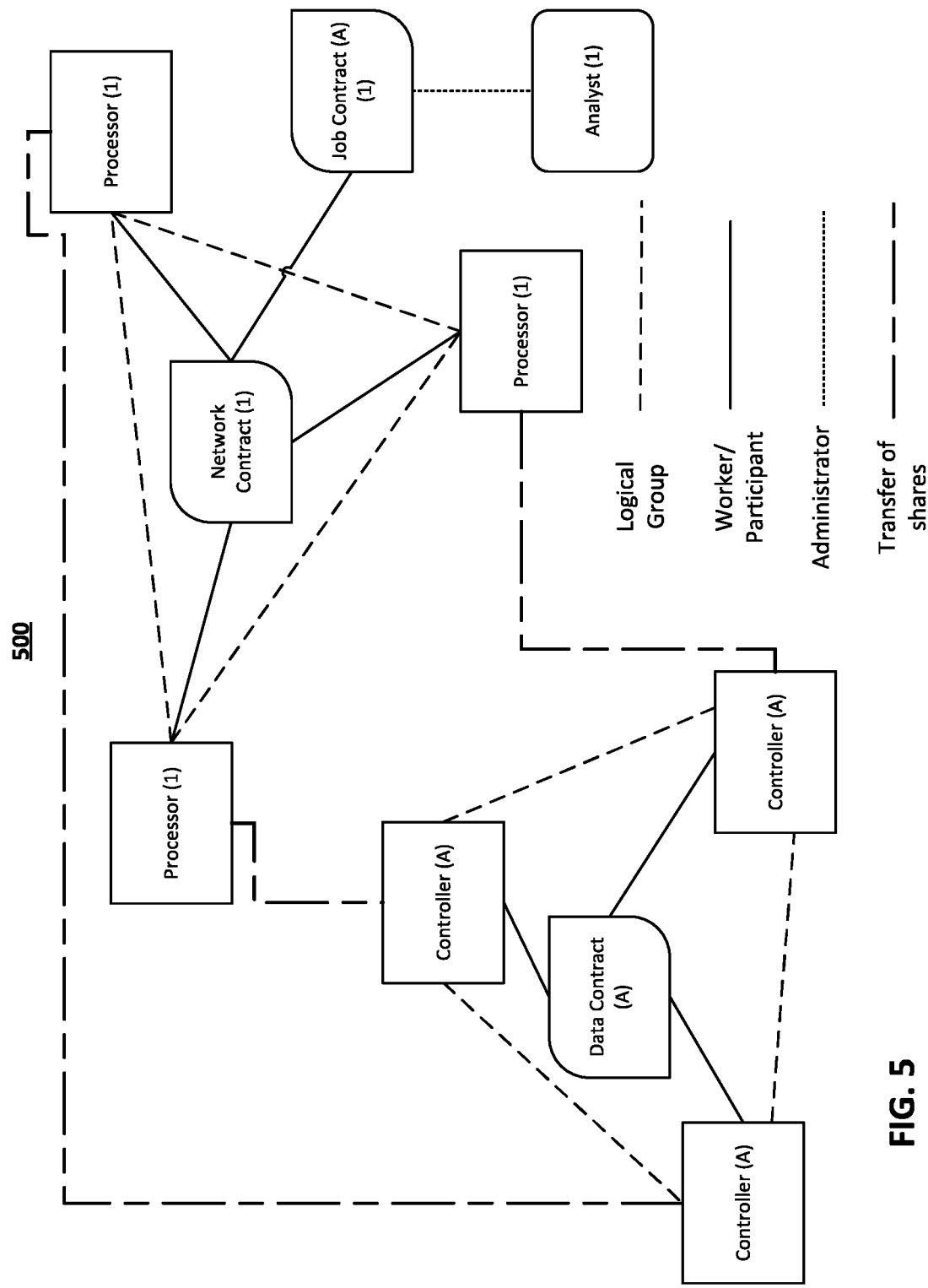
FIG. 5 is a block diagram illustrating a flow of shares from a plurality of controller nodes to a plurality of processor nodes when an analyst node makes a query by creating a job contract querying in the multi-party computation.

FIG. 5 is a block diagram 500 illustrating a flow of shares from a plurality of controller nodes to a plurality of processor nodes when an analyst node makes a query by creating a job contract querying in the multi-party computation. The analyst node defines the arithmetic computation that is to be performed on one or more datasets, that is computed on a computational network. More specifically, analyst node creates a job contract to represent the task. The analyst node has to specify the datasets used, the network to be computed on, as well as the specific arithmetic computation and its parameters. The analyst node is also responsible for ensuring that all the appropriate permissions for the various contracts are in place.

Once the job contact has been created, the processor nodes will process the query and compute the results, and store the results onto the blockchain 101. The analyst node will then retrieve the results from the blockchain 101. For example, in diagram 500, analyst (1) creates job contract (A)(1), which identifies processors identified in network contract (1) (i.e., processors listed as processor (1)) as the processor nodes, and identifies controllers identified in data contract (A) (i.e., controllers listed as controller (A)) as the controller nodes holding the shares to perform computations on. Job contract (A)(1) may identify where each processor node should retrieve a share from (i.e., the corresponding controller node), and the computation to perform (e.g., summation).

In some aspects, system 100 may include platform features to manage the reputation of network participants and may incorporate tokens/cryptocurrency to encourage network participation and good behavior.

Figure 6:
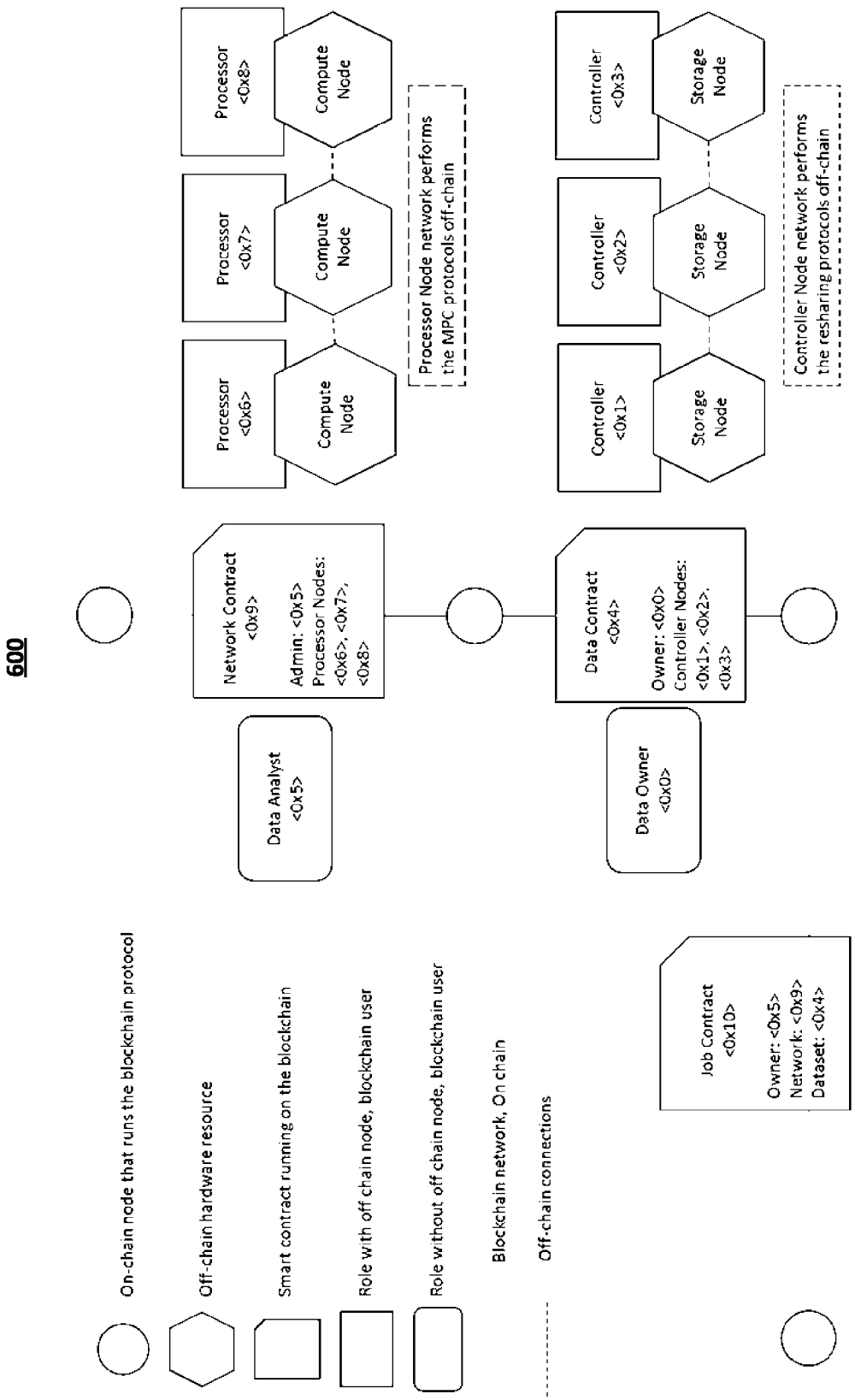
FIG. 6 is a block diagram illustrating various node types and their associated smart contracts.

FIG. 6 is a block diagram 600 illustrating various node types and their associated smart contracts. FIG. 6 depicts a plurality of on-chain nodes (represented by a circle) that run a blockchain protocol of a blockchain network. There are three smart contracts running on the blockchain, namely, network contract <0x9>, data contract <0x4>, and job contract <0x10>. It should be noted that each contract includes references to nodes and networks. For example, job contract <0x10> references its owner as data analyst <0x5>, network <0x9> and dataset <0x4>. Data contract <0x4> references its owner as data owner <0x0>, and references controller nodes <0x1>, <0x2>, <0x3>. Network contract <0x9> references its administrator as data analyst <0x5>, and associated processor nodes as <0x6>, <0x7>, and <0x8>. In some aspects, storage nodes and compute nodes are off-chain hardware resources. In some aspects, processor nodes and controller nodes roles with off chain nodes (blockchain users). In some aspects, data analysts and data owners are roles without off chain nodes (blockchain users as well).

Figure 7:
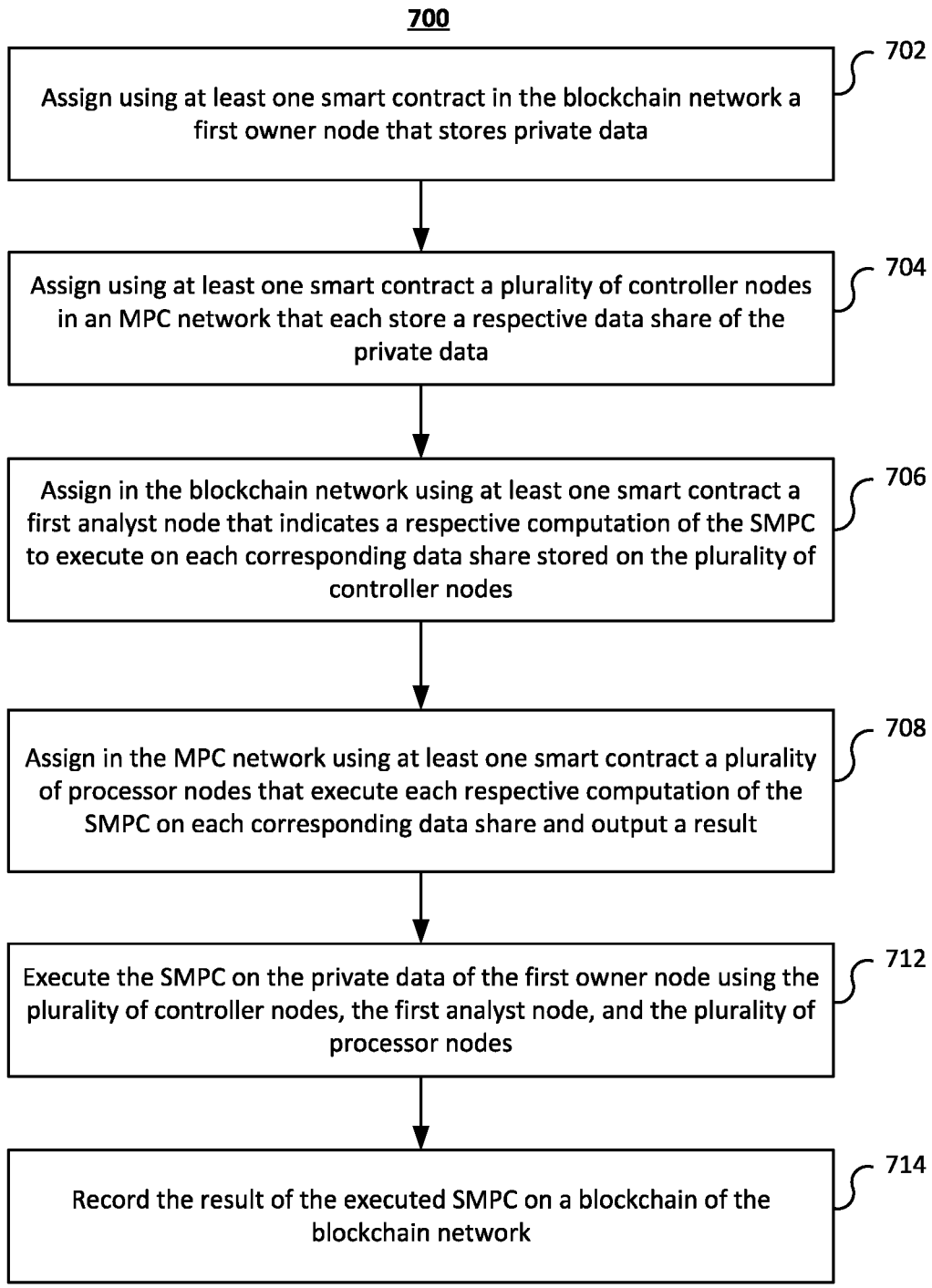
FIG. 7 illustrates a flow diagram of a method for executing a verifiable confidential computation using both an MPC network and a blockchain network.

FIG. 7 illustrates a flow diagram of method 700 for executing a verifiable confidential computation using both an MPC network and a blockchain network.

At 702, blockchain network 103 executes at least one smart contract in the blockchain network that assigns a node as a first owner node (e.g., owner (A) in FIG. 3) that stores private data. For example, the first owner node may include salary information of employees in a company. This is sensitive information that should not be directly shared with other parties.

In some aspects, the at least one smart contract comprises a registry contract that identifies and indicates a role of each node in blockchain network 103, wherein a node may have one or more roles as an owner node, a controller node, an analyst node, and a processor node.

At 704, blockchain network 103 executes at least one smart contract that assigns nodes in an MPC network as a plurality of controller nodes that each store a respective data share of the private data off-chain. In some aspects, the at least one smart contract comprises a data contract that is created by the first owner node. More specifically, the first owner node generates a plurality of data shares of the private data (e.g., secret shares of a salary dataset), and generates the data contract that specifies the plurality of controller nodes that will receive the plurality of data shares, wherein one controller node is assigned one data share. The first owner node then executes the data contract, which transmits each data share of the plurality of data shares to a corresponding controller node of the plurality of controller nodes.

In some aspects, the first owner node is one of the plurality of controller nodes.

In some aspects, first owner node is further configured to record in at least one block of blockchain 101, a hash value of each data share of the plurality of data shares and identifiers of each corresponding controller node that received each data share. In some aspects, an identifier may be a hash value of one of IP address, a MAC address, etc., or a wallet address of the controller node.

At 706, blockchain network 103 executes at least one smart contract that assigns a node as a first analyst node that indicates a respective computation of the SMPC to execute on each corresponding data share stored on the plurality of controller nodes. In some aspects, the at least one smart contract further comprises a job contract created by the first analyst node. More specifically, the first analyst node is configured to determine at least one computation of the SMPC and generate the job contract that specifies at least one processor node that will perform the at least one computation and at least one controller node that will provide a given data share.

At 708, blockchain network 103 executes at least one smart contract that assigns a node as a plurality of processor nodes of the MPC network that executes (off-chain) each respective computation of the SMPC on each corresponding data share and output a result. In some aspects, the at least one smart contract comprises a network contract that identifies the plurality of processor nodes as part of a computational network that performs computations off-chain. In some aspects, a processor node is also a controller node.

At 710, blockchain network 103 executes the SMPC on the private data of the first owner node using the plurality of controller nodes, the first analyst node, and the plurality of processor nodes.

At 712, blockchain network 103 records the result of the executed SMPC on blockchain 101.

In some aspects, blockchain network 103 may execute a resharing protocol that generates a new set of data shares in response to detecting a transfer of data shares between the plurality of controller nodes. In some aspects, the resharing protocol is shamir's secret sharing.

In some aspects, blockchain network 103 comprises a second owner node (e.g., owner (B) in FIG. 3) with different private data and a second analyst node assigned using at least one other smart contract. Blockchain network 103 may execute a different SMPC on the different private data of the second owner node using another plurality of controller nodes (e.g., controller (B)), the second analyst node, and another plurality of processor nodes of the blockchain network. Blockchain network 103 may then record a result of the executed different SMPC on the blockchain 101. In some aspects, at least one processor node is part of both the plurality of processor nodes and the another plurality of processor nodes. In some aspects, at least one controller node (e.g., controller (A)(B)) is part of both the plurality of controller nodes and the another plurality of controller nodes.

It should be noted that two owner nodes with the same type of private dataset may work together to execute a SMPC. For example, the first owner node may store private salary data of a first company and the second owner node may store private salary data of a second company. Both companies may wish to determine an average salary across the two companies. Both owner nodes may work with analyst nodes (e.g., the first analyst node and the second analyst node) that coordinate the computations such that the salary average may be determined without revealing individual salaries. Both analyst nodes may select the same or different processor nodes and/or controller nodes to perform the unified computation between two different owner nodes.

Figure 8:
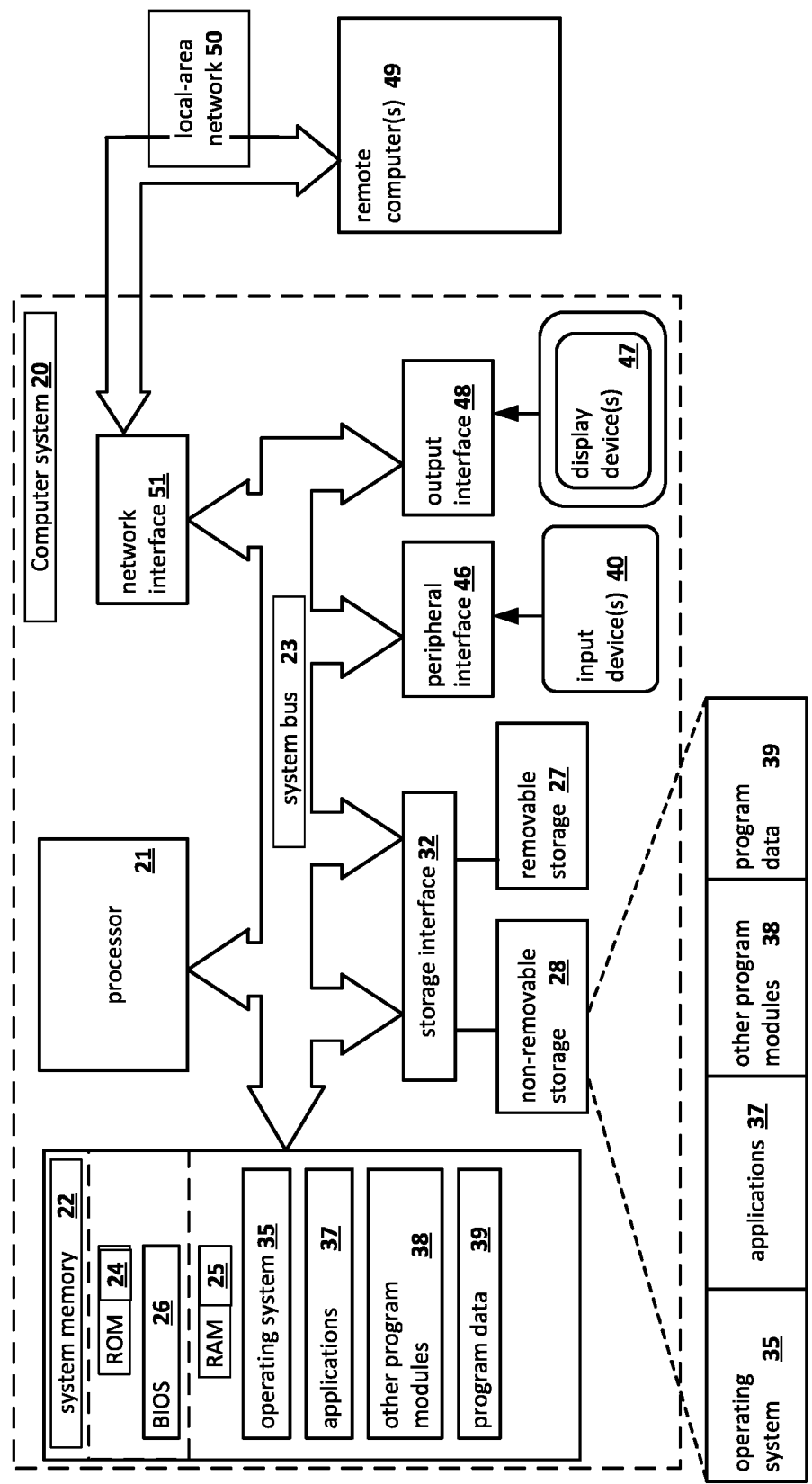
FIG. 8 presents an example of a general-purpose computer system on which aspects of the present disclosure can be implemented.

FIG. 8 is a block diagram illustrating a computer system 20 on which aspects of systems and methods for executing a privacy preserving arithmetic computation on private data over a subset of independent network participants may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-6 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for executing a verifiable confidential computing using both a multi-party computation (MPC) network and a blockchain network, the method comprising:
   assigning using at least one smart contract of the blockchain network:
   a first owner node that stores private data,
   a plurality of controller nodes that each store a respective data share of the private data off-chain from the blockchain network, a first analyst node that indicates a respective computation of a secure MPC to execute on each corresponding data share stored on the plurality of controller nodes, and a plurality of processor nodes that execute, off-chain from the blockchain network, each respective computation of the secure MPC on each corresponding data share and output a result;

executing the secure MPC on the private data of the first owner node using the plurality of controller nodes, the first analyst node, and the plurality of processor nodes;

recording the result of the executed secure MPC on a blockchain of the blockchain network, wherein the blockchain network comprises a second owner node with different private data and a second analyst node assigned using at least one other smart contract, further comprising:

executing a different secure MPC on the different private data of the second owner node using another plurality of controller nodes, the second analyst node, and another plurality of processor nodes of the blockchain network; and recording a result of the executed different secure MPC on the blockchain of the blockchain network.

2. The method of claim 1, wherein the at least one smart contract comprises a registry contract that identifies and indicates a role of each node in the blockchain network and the MPC network, wherein a node may have one or more roles as an owner node, a controller node, an analyst node, and a processor node.

3. The method of claim 1, wherein the at least one smart contract comprises a data contract, wherein the first owner node is configured to:

generate a plurality of data shares of the private data;

generate the data contract that specifies the plurality of controller nodes that will receive the plurality of data shares, wherein one controller node is assigned one data share; and transmit each data share of the plurality of data shares to a corresponding controller node of the plurality of controller nodes.

4. The method of claim 3, wherein the first owner node is further configured to record in at least one block of the blockchain, a hash value of each data share of the plurality of data shares and identifiers of each corresponding controller node that received each data share.

5. The method of claim 1, wherein the at least one smart contract comprises a network contract that identifies the plurality of processor nodes as part of a computational network that performs computations off-chain.

6. The method of claim 5, wherein the at least one smart contract further comprises a job contract, wherein the first analyst node is configured to:

determine at least one computation of the secure MPC; and generate the job contract that specifies at least one processor node that will perform the at least one computation and at least one controller node that will provide a given data share.

7. The method of claim 1, further comprising:

executing a resharing protocol that generates a new set of data shares in response to detecting a transfer of data shares between the plurality of controller nodes.

8. The method of claim 7, wherein the resharing protocol is shamir's secret sharing.

9. The method of claim 1, wherein at least one processor node is part of both the plurality of processor nodes and the another plurality of processor nodes.

10. The method of claim 1, wherein at least one controller node is part of both the plurality of controller nodes and the another plurality of controller nodes.

11. The method of claim 1, wherein the first owner node is one of the plurality of controller nodes.

12. The method of claim 1, wherein a processor node is also a controller node.

13. A system for executing a secure multi-party computation (MPC) using both an MPC network and a blockchain network, comprising:

a memory; and a hardware processor communicatively coupled with the memory and configured to:

assign using at least one smart contract of the blockchain network:

a first owner node that stores private data, a plurality of controller nodes that each store a respective data share of the private data off-chain from the blockchain network, a first analyst node that indicates a respective computation of a secure MPC to execute on each corresponding data share stored on the plurality of controller nodes, and a plurality of processor nodes that execute, off-chain from the blockchain network, each respective computation of the secure MPC on each corresponding data share and output a result;

execute the secure MPC on the private data of the first owner node using the plurality of controller nodes, the first analyst node, and the plurality of processor nodes;

record the result of the executed secure MPC on a blockchain of the blockchain network, wherein the blockchain network comprises a second owner node with different private data and a second analyst node assigned using at least one other smart contract, further comprising:

executing a different secure MPC on the different private data of the second owner node using another plurality of controller nodes, the second analyst node, and another plurality of processor nodes of the blockchain network; and recording a result of the executed different secure MPC on the blockchain of the blockchain network.

14. The system of claim 13, wherein the at least one smart contract comprises a registry contract that identifies and indicates a role of each node in the blockchain network and the MPC network, wherein a node may have one or more roles as an owner node, a controller node, an analyst node, and a processor node.

15. The system of claim 13, wherein the at least one smart contract comprises a data contract, wherein the first owner node is configured to:

generate a plurality of data shares of the private data;

generate the data contract that specifies the plurality of controller nodes that will receive the plurality of data shares, wherein one controller node is assigned one data share; and transmit each data share of the plurality of data shares to a corresponding controller node of the plurality of controller nodes.

16. The system of claim 15, wherein the first owner node is further configured to record in at least one block of the blockchain, a hash value of each data share of the plurality of data shares and identifiers of each corresponding controller node that received each data share.

17. The system of claim 13, wherein the at least one smart contract comprises a network contract that identifies the plurality of processor nodes as part of a computational network that performs computations off-chain.

18. The system of claim 17, wherein the at least one smart contract further comprises a job contract, wherein the first analyst node is configured to:
  determine at least one computation of the secure MPC; and
  generate the job contract that specifies at least one processor node that will perform the at least one computation and at least one controller node that will provide a given data share.

19. A non-transitory computer readable medium storing thereon computer executable instructions for executing a verifiable confidential computation using both a multi-party computation (MPC) network and a blockchain network, including instructions for:
  assigning using at least one smart contract of the blockchain network:
    a first owner node that stores private data,
    a plurality of controller nodes that each store a respective data share of the private data off-chain from the blockchain network,
    a first analyst node that indicates a respective computation of a secure MPC to execute on each corresponding data share stored on the plurality of controller nodes, and
    a plurality of processor nodes that execute, off-chain from the blockchain network, each respective computation of the secure MPC on each corresponding data share and output a result;
  executing the secure MPC on the private data of the first owner node using the plurality of controller nodes, the first analyst node, and the plurality of processor nodes;
  recording the result of the executed secure MPC on a blockchain of the blockchain network, wherein the blockchain network comprises a second owner node with different private data and a second analyst node assigned using at least one other smart contract, further comprising:
  executing a different secure MPC on the different private data of the second owner node using another plurality of controller nodes, the second analyst node, and another plurality of processor nodes of the blockchain network; and
  recording a result of the executed different secure MPC on the blockchain of the blockchain network.

* * * * *